US009609688B2

(12) United States Patent
Prakash et al.

(10) Patent No.: US 9,609,688 B2
(45) Date of Patent: Mar. 28, 2017

(54) METHODS AND APPARATUS TO FACILITATE RELAY STARTUP AND RADIO LINK FAILURE (RLF) HANDLING

(75) Inventors: Rajat Prakash, San Diego, CA (US);
Fatih Ulupinar, San Diego, CA (US);
Ravi Palanki, San Diego, CA (US);
Nathan E. Tenny, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 13/079,477

(22) Filed: Apr. 4, 2011

(65) Prior Publication Data

US 2011/0242970 A1  Oct. 6, 2011

Related U.S. Application Data

(60) Provisional application No. 61/321,059, filed on Apr. 5, 2010.

(51) Int. Cl.
*H04W 24/10* (2009.01)
*H04W 76/06* (2009.01)
*H04B 7/26* (2006.01)
*H04W 84/04* (2009.01)

(52) U.S. Cl.
CPC ......... *H04W 76/068* (2013.01); *H04B 7/2606* (2013.01); *H04W 84/047* (2013.01)

(58) Field of Classification Search
CPC .... G06F 11/00; H04W 84/047; H04B 7/2606; H04B 7/155
USPC .............. 370/216, 225, 226, 241, 242, 243, 370/315–327
See application file for complete search history.

(56) References Cited

U.S. PATENT DOCUMENTS

| 2005/0180451 | A1* | 8/2005 | Hara et al. ..................... 370/463 |
| 2007/0133394 | A1* | 6/2007 | Walton et al. ................ 370/216 |
| 2008/0075094 | A1* | 3/2008 | Ahn et al. ..................... 370/400 |
| 2009/0061767 | A1* | 3/2009 | Horiuchi ................ H04B 7/155 455/18 |
| 2010/0208645 | A1* | 8/2010 | Hamalainen et al. ........ 370/315 |

FOREIGN PATENT DOCUMENTS

CN   101043370 A    9/2007
WO   WO-2009043866 A2   4/2009

OTHER PUBLICATIONS

Potevio, Behavior Associate to RLF on Un, Apr. 4, 2010 (See, IDS filed Oct. 3, 2012, Cite No. 6).*

(Continued)

*Primary Examiner* — Jamal Javaid
(74) *Attorney, Agent, or Firm* — Ke Liu

(57) ABSTRACT

Certain aspects of the present disclosure provide techniques and apparatus for startup and recovery of a radio link between a relay node and a donor base station. According to certain aspects, a relay node may perform a random access procedure utilizing a random access channel (RACH) to transition between Uu interface operations and Un interface operations. According to certain aspects, the relay node may perform radio link failure (RLF) recovery utilizing RACH procedures for a Un interface. The procedures described herein, according to certain aspects, may utilize a dedicated relay RACH resource and a Relay Physical Downlink Control Channel (R-PDCCH).

40 Claims, 8 Drawing Sheets

(56) References Cited

OTHER PUBLICATIONS

Huawei, RRC States and Procedure of Relay, Feb. 2010 (See, IDS filed Oct. 3, 2012, Cite No. 2).*
CATT: "Control Plane for Un interface", 3GPP Draft; R2-100176, 3rd Generation Partnership Project (3GPP), Mobile Competence Centre ; 650, Route Des Lucioles ; F-06921 Sophia-Antipolis Cedex ; France, vol. RAN WG2, no. Valencia, Spain; 20100118, Jan. 12, 2010 (Jan. 12, 2010), XP050420957.
Huawei: "RRC states and procedures of relay", 3GPP Draft; R2-101174 RRC States and Procedures of Relay, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20100222, Feb. 13, 2010 (Feb. 13, 2010), XP050421437.
International Search Report and Written Opinion—PCT/US2011/031187, International Search Authority—European Patent Office—Aug. 19, 2011.
LG Electronics Inc: "RRC Connection Group Release from Relay Node", 3GPP Draft; R2-102128 RN RRC Connection Group Release R0, 3rd Generation Partnership Project (3GPP), Mobile Competence Centre ; 650, Route Des Lucioles ; F-06921 Sophia-Antipolis Cedex ; France, vol. RAN WG2, no. Beijing, china; 20100412, Apr. 5, 2010 (Apr. 5, 2010), XP050422439.
NTT Docomo et al: "Rel-9 RLF handling enhancements", 3GPP Draft; R2-094890 RLF Handling, 3rd Generation Partnership Project (3GPP), Mobile.
Competence Centre ; 650, Route Des Lucioles ; F-06921 Sophia-Antipolis Cedex ; France, no. Shenzhen, China; 20090818, Aug. 18, 2009 (Aug. 18, 2009), XP050352856.
Potevio: "Behavior associate to RLF on Un", 3GPP Draft; R2-102006 Behavior Associate to RLF on Un, 3rd Generation Partnership Project (3GPP), Mobile Competence Centre 650, Route Des Lucioles ; F-06921 Sophia-Antipolis Cedex ; France, vol. RAN WG2, no. Beijing, china; 20100412, Apr. 4, 2010 (Apr. 4, 2010), XP050422361.
Ericsson, "Issues related to RN Random Access Procedure on Un", 3GPP TSG-RAN WG2 #69 R2-101207, =Feb. 22, 2010, 2 Pages.

\* cited by examiner

METHODS AND APPARATUS TO FACILITATE RELAY STARTUP AND RADIO LINK FAILURE (RLF) HANDLING

CLAIM OF PRIORITY UNDER 35 U.S.C. §119

The present application for patent claims benefit of U.S. Provisional Patent Application Ser. No. 61/321,059, entitled, "Methods and Apparatus to Facilitate Relay Startup, System Information Change, and Radio Link Failure (RLF) Handling," filed Apr. 5, 2010 and assigned to the assignee hereof and hereby expressly incorporated by reference herein.

BACKGROUND

Field

Certain aspects of the disclosure relate generally to wireless communications systems and, more particularly, to techniques for operating a relay in a telecommunications network.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home Node Bs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

SUMMARY

Certain aspects of the present disclosure provide a method for wireless communications. The method generally includes detecting, at a relay, failure of a radio link with a base station and delaying for a wait period after detecting the radio link failure. The method further includes releasing one or more user equipments (UEs) after expiration of the wait period.

Certain aspects of the present disclosure provide a method for wireless communications. The method generally includes detecting, at a relay, failure of a radio link with a base station and using a resource of a relay-specific random access channel (RACH) to establish another radio link with the base station, the resource designated for use by the relay.

Certain aspects of the present disclosure provide a method for wireless communications. The method generally includes using, at a base station responsive to a failure of a radio link with a relay, a resource of a relay-specific RACH to establish another radio link with the relay, the resource designated for use by the relay.

Certain aspects of the present disclosure provide an apparatus for wireless communications. The apparatus generally includes a link detection component configured to detect a failure of a radio link with a base station. The apparatus further includes a connection component configured to delay for a wait period after detecting the radio link failure and release one or more UEs after expiration of the wait period.

Certain aspects of the present disclosure provide an apparatus for wireless communications. The apparatus generally includes a link detection component configured to detect failure of a radio link with a base station. The apparatus may also include a random access component configured to use a resource of a relay-specific RACH to establish another radio link with the base station, the resource designated for use by the apparatus.

Certain aspects of the present disclosure provide an apparatus for wireless communications. The apparatus generally includes a random access component configured to, responsive to a failure of a radio link with a relay, use a resource of a relay-specific RACH to establish another radio link with the relay, the resource designated for use by the relay.

Certain aspects of the present disclosure provide an apparatus for wireless communications. The apparatus generally includes means for detecting a failure of a radio link with a base station, means for delaying for a wait period after detecting the radio link failure, and means for releasing one or more UEs after expiration of the wait period.

Certain aspects of the present disclosure provide an apparatus for wireless communications. The apparatus generally includes means for detecting failure of a radio link with a base station and means for using a resource of a relay-specific RACH to establish another radio link with the base station, the resource designated for use by the apparatus.

Certain aspects of the present disclosure provide an apparatus for wireless communications. The apparatus generally includes means for, responsive to a failure of a radio link with a relay, using a resource of a relay-specific RACH to establish another radio link with the relay, the resource designated for use by the relay.

Certain aspects of the present disclosure provide a computer-program product comprising a computer-readable medium having instructions stored thereon. The instructions are generally executable by one or more processors for detecting, at a relay, a failure of a radio link with a base station, delaying for a wait period after detecting the radio link failure, and releasing one or more UEs after expiration of the wait period.

Certain aspects of the present disclosure provide a computer-program product comprising a computer-readable medium having instructions stored thereon. The instructions are generally executable by one or more processors for detecting, at a relay, failure of a radio link with a base station and using a resource of a relay-specific RACH to establish another radio link with the base station, the resource designated for use by the relay.

Certain aspects of the present disclosure provide a computer-program product comprising a computer-readable medium having instructions stored thereon. The instructions are generally executable by one or more processors for responsive to a failure of a radio link with a relay, using, at a base station, a resource of a relay-specific RACH to establish another radio link with the relay, the resource designated for use by the relay.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
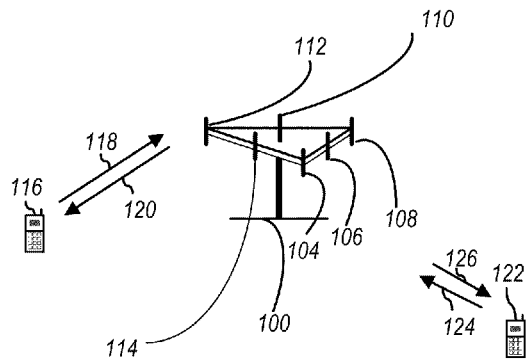
FIG. 1 illustrates a multiple access wireless communication system.

In some wireless networks having relays, the backhaul link between a relay and donor base station is provided through a Un interface. According to certain aspects, the activation of the Un interface involves a transition from Uu interface operations to Un interface operations between the relay and donor base station. In such cases, the relay node and the donor base station may have to know which type of interface, Uu or Un, is being used at a given point in time to communicate between the relay node and donor base station. Otherwise, a lack of synchronization between the transition times at the relay and at the donor base station may cause problems at the physical layers, for example, if the hybrid automatic repeat request (HARQ) timeline is changed or if new channels such as relay physical downlink control channel (R-PDCCH) are utilized. As such, this transition from Uu interface operations to Un interface operations between the relay and donor base station may involve a hard transition, thereby providing a strict demarcation boundary between Uu and Un operations. According to certain aspects of the present disclosure, a relay startup procedure for establishing a Un interface utilizing a random access channel (RACH) process and a R-PDCCH is described herein that provides this hard boundary for a Un-Uu interface transition.

Additionally, in some cases, a relay may experience radio problems that may cause radio link failure (RLF) on the backhaul link between the relay and donor base station. Though the relay may have a less challenging radio environment than a wireless terminal, the relay may experience changes in propagation (e.g., due to passing vehicles), interference (e.g., network loading), and deployment (e.g., base stations and frequencies dynamically switched off for capacity). Accordingly, certain aspects of the present disclosure provide a procedure for establishing a Un interface to recover from RLF of the backhaul link between the relay and donor base station. According to certain aspects, a relay may utilize Un RACH procedures, with RACH on a resource reserved for relays, and an R-PDCCH-based RACH response.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the aspect shown in FIG. 1, each antenna group is designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 124. Also, an access point using beamforming to transmit to access terminals scattered randomly through its coverage causes less interference to access terminals in neighboring cells than an access point transmitting through a single antenna to all its access terminals.

According to certain aspects, an AT 116 may be in communication with an AP 100 by means of a radio interface, such as a Uu interface. Further, additional APs 100 may be inter-connected with each other by means of an interface known as X2, and to a network node, such as an Enhanced Packet Core (EPC) node, by means of an S1 interface.

An access point may be a fixed station used for communicating with the terminals and may also be referred to as a base station, a Node B, an evolved Node B (eNB), an eNodeB, or some other terminology. An access terminal may also be called a mobile station (MS), user equipment (UE), a wireless communication device, wireless terminal, or some other terminology.

Figure 2:
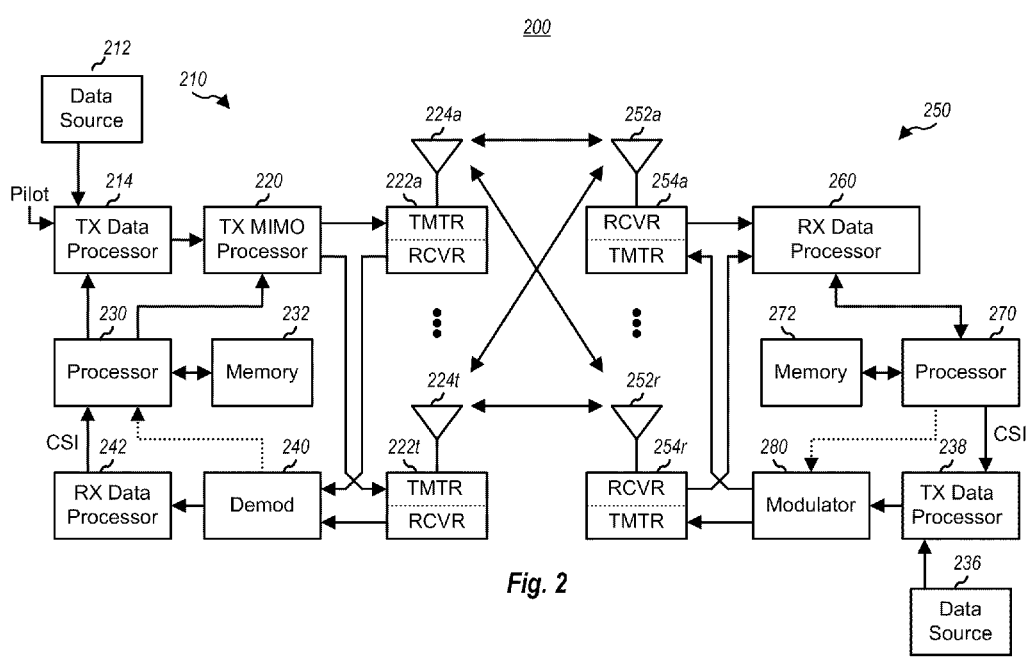
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 4:
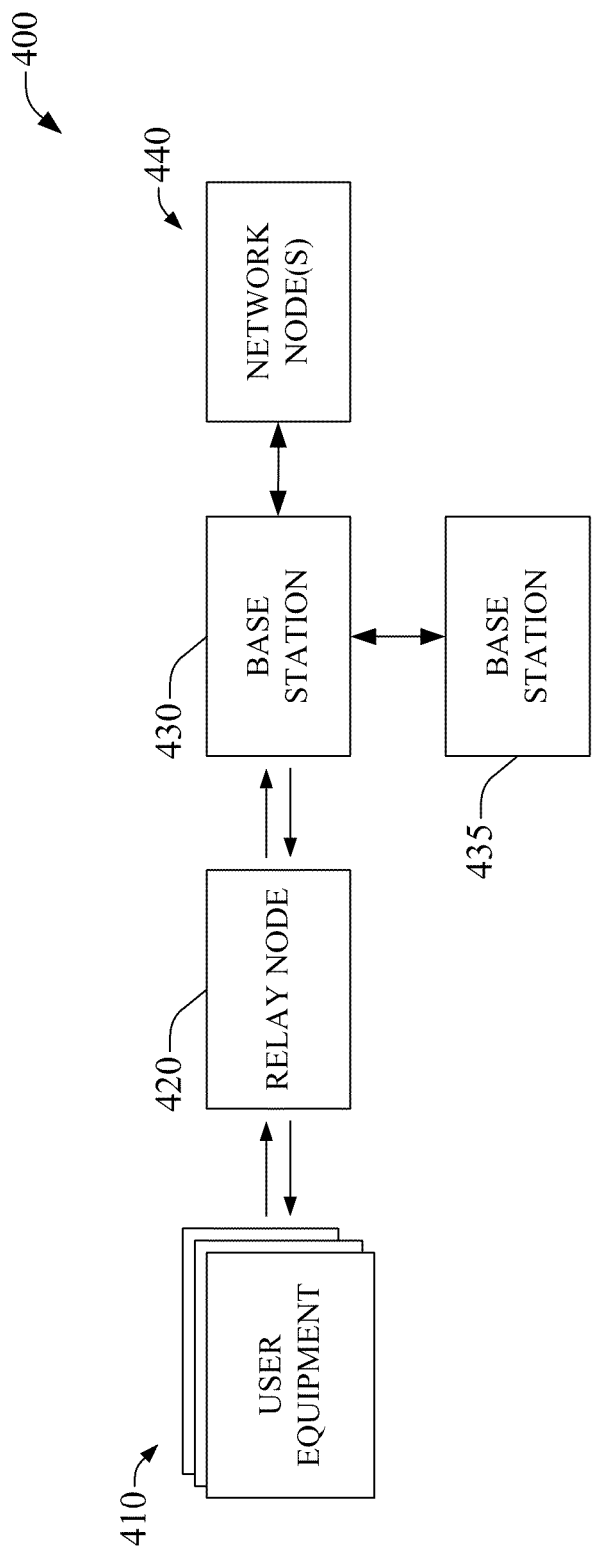
FIG. 4 is a block diagram of an example wireless communication system with a relay node according to certain aspects of the present disclosure.
Figure 5:
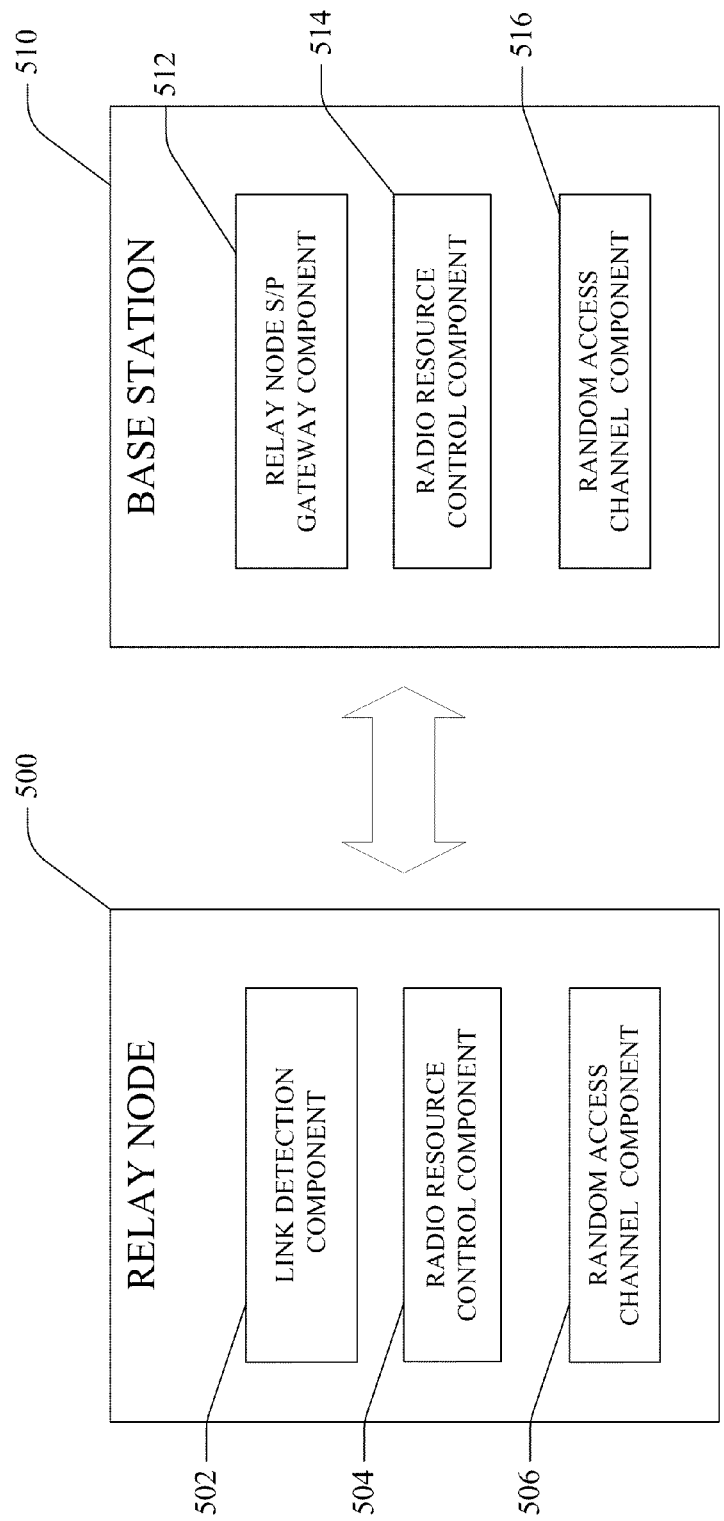
FIG. 5 illustrates exemplary communication apparatuses configured to manage a radio link according to certain aspects of the present disclosure.

According to certain aspects of the present disclosure, the transmitter system 210 includes additional components for operating in a wireless communications network having a relay node, as described herein. Specifically, the transmitter system 210 may be configured as a donor base station as shown in FIGS. 4-5. According to certain aspects, the transmitter system 210 may be configured to perform relay start up and RLF recovery operations as described below.

According to certain aspects, the transmitter system 210 and receiver system 250 may be configured to detect a failure of the radio link, as described herein. For example, the processors 230, 270 may be configured to utilize a radio link timer, wherein an expiration of the timer may indicate radio link failure. According to certain aspects, the transmitter system 210 may be configured to detect, or receive an indication of, failure of a radio link between the transmitter system 210 and a relay node, in communication therewith.

According to certain aspects, logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+ MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

According to certain aspects, Transport Channels are classified into DL and UL. DL Transport Channels comprise a Broadcast Channel (BCH), a Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
For the purposes of the present document, the following abbreviations apply:
ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C- Control-
CB Contention-Based
CCE Control Channel Element
CCCH Common Control CHannel
CCH Control CHannel
CCTrCH Coded Composite Transport Channel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared Channel
DSP Digital Signal Processor
DTCH Dedicated Traffic CHannel
E-CID Enhanced Cell IDentification
EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control Channel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access Channel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator RNTI Radio Network Temporary Identifier
RS Reference Signal
RTT Round Trip Time
Rx Receive
SAP Service Access Point
SDU Service Data Unit
SFBC Space Frequency Block Code
SHCCH SHared channel Control CHannel
SINR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper FIeld
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol
MBSFN multicast broadcast single frequency network
MCH multicast channel
DL-SCH downlink shared channel
PDCCH physical downlink control channel
PDSCH physical downlink shared channel An Example Relay System Wireless communication systems may comprise a relay base station associated with a donor base station to provide service to wireless terminals. The relay base station may be used to supplement and extend coverage in a given geographical area. The relay base station may communicate with the donor base station via a backhaul link, sometimes referred to as a "Un interface" and with the terminals via an access link, sometimes referred to as a "Uu interface." Generally, the relay base station may receive messages from the donor base station over the backhaul link and relay these messages to the terminals. Similarly, the relay base station may receive messages from the terminals over the access link and relay these messages to the donor base station. As such, the backhaul link between the relay base station and donor base station represents an important part of a telecommunications network with relays. The backhaul link between the relay base station and donor base station thus faces challenges in relation to initialization, configuration, reliability, and resiliency. Accordingly, there is a demand for techniques and mechanisms for managing a backhaul link between a relay and donor base station in a wireless network.

Figure 3:
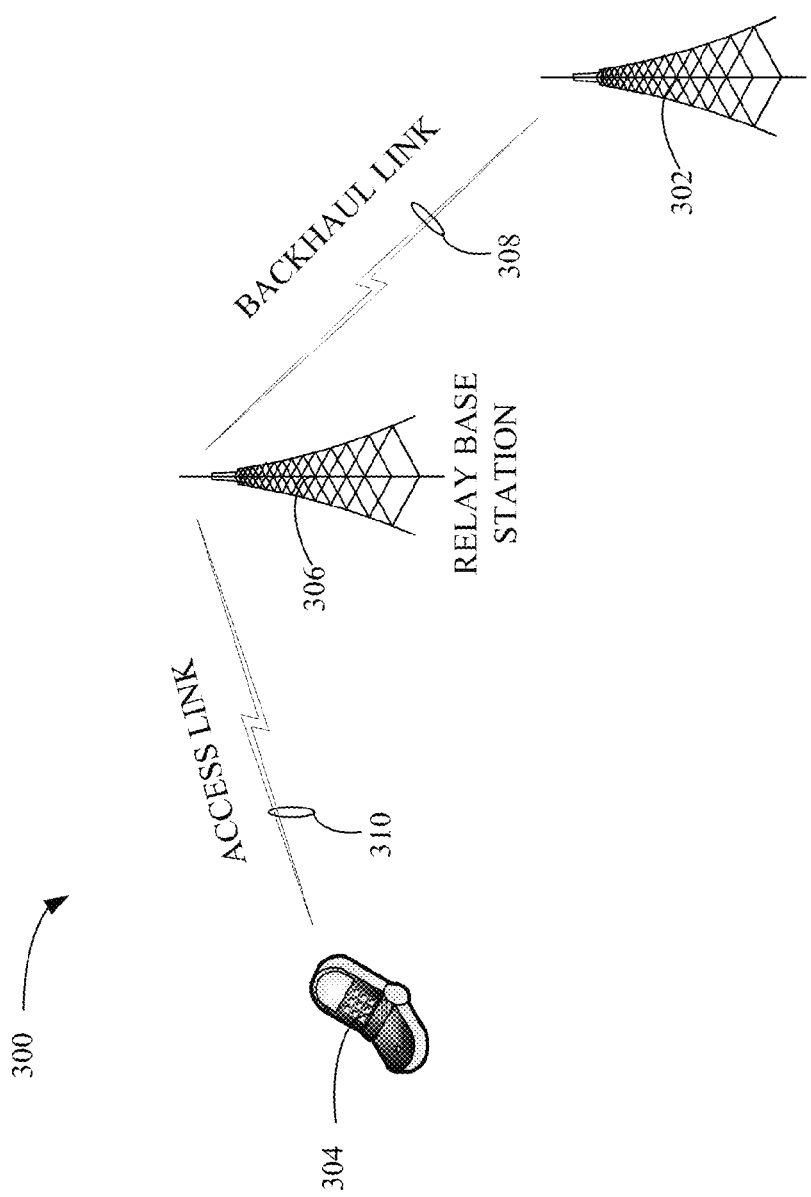
FIG. 3 illustrates an exemplary wireless communication system with a relay base station according to certain aspects of the present disclosure.

FIG. 3 illustrates an example wireless system 300 in which certain aspects of the present disclosure may be practiced. As illustrated, the system 300 includes a donor base station (also known as a donor access point (AP), a donor BS, a donor eNodeB, or DeNB) 302 that communicates with a user equipment (UE) 304 via a relay BS (also known as relay access point or relay node) 306. The relay BS 306 may communicate with the donor BS 302 via a backhaul link 308 and with the UE 304 via an access link 310.

In other words, the relay BS 306 may receive downlink messages from the donor BS 302 over the backhaul link 308 and relay these messages to the UE 304 over the access link 310. Similarly, the relay BS 306 may receive uplink messages from the UE 304 over the access link 310 and relay these messages to the donor BS 302 over the backhaul link 308. The relay BS 306 may, thus, be used to supplement a coverage area and help fill "coverage holes."

According to certain aspects, the relay BS 306 may communicate with the UE 304 (i.e., relay downlink messages to the UE and receive uplink messages from the UE) utilizing at least a Uu interface on the access link 310 connecting the relay BS 306 and UE 304. According to certain aspects, the relay BS 306 may communicate with the donor BS 302 utilizing a Un interface connecting the relay BS 306 and donor BS 302 on the backhaul link 308.

FIG. 4 illustrates a block diagram of an example system 400 that is configured to perform techniques for relay startup and RLF recovery according to certain aspects of the present disclosure. Example system 400 represents a wireless telecommunication network having a plurality of UEs 410, a relay node 420, base stations 430, 435, and a network node 440.

The base station 430 operates as the donor base station of relay node 420. As such, the relay node 420 may serve multiple UEs 410 by relaying wireless communications between the UEs 410 and the base station 430. The base station 430 may provide communication between the plurality of UEs 410 and the at least one network node 440. Additionally, the base station 430 may be inter-connected with base station 435 to share load, interference, or handover-related information. The network nodes 440 may be configured to manage network services for the UEs 410.

Generally, the network node 440 manages connections of the system 400 through control plane signals transmitted to the UEs 410, relay node 420, and base stations 430, 435. According to certain aspects, the network node 440 may perform Non-Access Stratum (NAS) procedures to attach the relay node 420 to the system 400, configure the relay node 420 for operation as a relay in the system 400, and to recover connections with the relay node 420 should a radio link of the relay node 420 fail. According to certain aspects, the network node 440 may be an Evolved Packet Core (EPC) network node, such as a mobility management entity (MME).

FIG. 5 illustrates a relay node 500 and a donor base station 510 in communication according to certain aspects of the present disclosure. While certain aspects of the disclosure are discussed in regards to the relay node 500 and a donor base station 510, it is understood that other suitable communications apparatuses are contemplated, such as a macrocell, a femtocell, a picocell, an access point, a mobile base station, a portion thereof, and/or substantially any wireless device that transmits signals to one or more disparate devices in a wireless network. According to certain aspects, the relay node 500 and donor base station 510 may be the relay node 420 and base station 430 as described in FIG. 4.

The relay node 500 generally includes a link detection component 502, a radio resource control (RRC) component 504, and a RACH component 506. The link detection component 502 is generally configured to perform radio link failure detection operations described herein. For example, the link detection component 502 is configured to detect a failure of a radio link connecting the relay node 500 with the donor base station 510. The RRC component 504 is generally configured to perform radio resource operations to establish and support connections with the donor base station 510 and at least one UE. The RRC component 504 may further be configured to release the at least one UE according to certain aspects. The RACH component 506 is configured to perform RACH operations as described in further detail below. According to certain aspects, the RACH component 506 is configured to perform a RACH procedure using a relay-specific R-PDCCH and relay-specific radio resource to start up or recover a backhaul link.

The donor base station 510 generally includes a relay node Serving and PDN Gateway (S/P-GW) component 512, a RRC component 514, and a RACH component 516. Generally, it is understood that the discussion with regards to the RRC component 514 and the RACH component 516 similarly apply to the respective components of the relay node 500. It is further understood that the corresponding RRC component 504, 514 and RACH components 506, 516 may communicate using signaling and other request and response messages to perform the operations described herein. For example, the RACH component 506 may transmit a RACH message to the RACH component 516 of the base station 510 to perform a random access procedure. In another example, the RRC component 504 of the relay 500 may transmit a RRC Connection setup request to the RRC component 514 of the base station 510 to first establish a Uu interface between the relay 500 and base station 510 before reconfiguring the interface to a Un interface according to certain aspects described below.

Example Relay Startup

Figure 6:
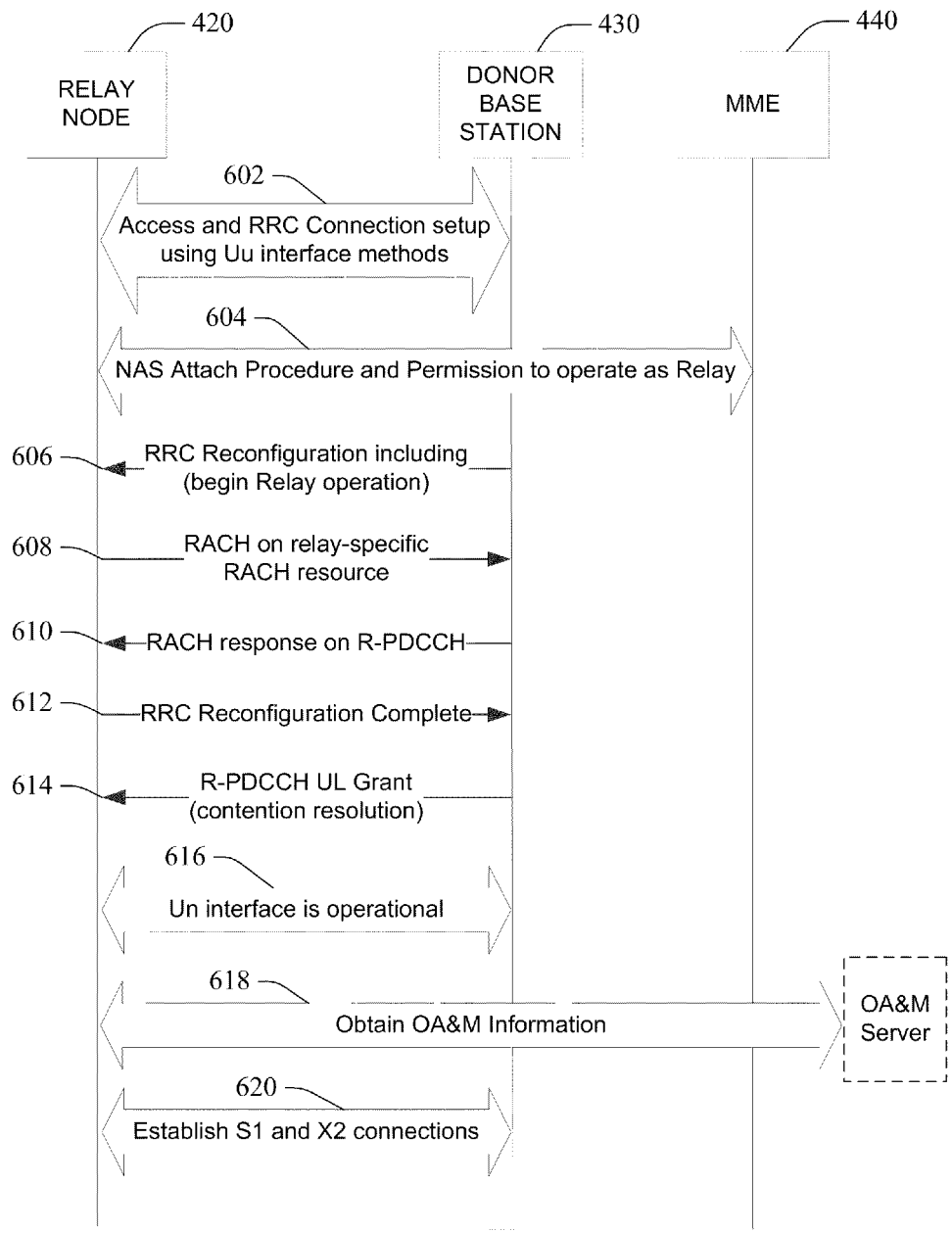
FIG. 6 is a sequence diagram illustrating example operations for relay startup according to certain aspects of the present disclosure.

FIG. 6 is a sequence diagram illustrating example operations for relay startup according to certain aspects of the disclosure. As described above, certain aspects of the present disclosure provide an example procedure for a relay node to transition from a Uu interface to a Un interface utilizing a RACH process. For clarity, the operations are depicted as being performed by the example system 400 shown in FIG. 4, but it is understood that the example operations may be performed by any suitable apparatus and components according to aspects of the disclosure.

The example operations begin at 602 where a relay node may connect to a donor base station using Uu interface methods. In other words, the relay node may connect to the donor base station using procedures similar to how a UE would connect to the donor base station. According to certain aspects, the relay node and the donor base station may perform an RRC connection establishment procedure which includes exchanging an RRC Connection Request message, a RRC Connection Setup message, and a RRC Connection Setup Complete message. According to certain aspects, the relay node may transmit relay-specific parameters during the connection setup procedure at 602, such as an indication that a connection is being established to a relay node. For example, according to certain aspects, the RRC Connection Setup Complete message transmitted by the relay node may comprise an indication that an RRC connection setup has been completed with a relay node. It is understood that the connection setup at 602 may further include additional processes for authenticating and configuring a Uu interface, such as a security activation and radio bearer establishment.

At 604, the relay node may perform an attach procedure with an MME and request permission to operate as a relay node within the wireless network. According to certain aspects, the relay node may initiate an NAS Attach procedure with the MME that includes a negotiation that the relay node is permitted to act as a relay while connected with the donor base station. According to certain aspects, the MME may signal to the donor base station that the relay node is permitted to operate as a relay.

At 606, the relay node may receive a reconfiguration command from the donor base station including an indication to the relay node to begin operation as a relay. According to certain aspects, the reconfiguration command may include an RRC Connection Reconfiguration message configured to request the relay node to begin relay operations and processes. According to certain aspects, the reconfiguration command at 606 may further include additional aspects of relay configuration (such as R-PDCCH configuration). Alternatively, these additional aspects of relay configuration may be signaled earlier with broadcast parameters. According to certain aspects, at 606, responsive to signaling from the MME at 604, the donor base station may initialize preparations to transition to a Un interface, as described above. For example, the donor base station may anticipate receiving a RACH transmission (e.g., such as at 608 and at 612) on a RACH resource reserved for relay operation, as described below.

Starting at 608, the relay node may initiate a random access procedure to transition the interface between the relay node and donor base station from the Uu interface to a Un interface. Generally, a random access procedure comprises a four-step process to establish uplink synchronization, obtain an assignment of uplink resources, and obtain an identity. The four-step process generally includes an exchange of messages comprising (1) a random access preamble ("Message 1"), (2) a random access response ("Message 2"), (3) a random access message ("Message 3"), and (4) a random access contention resolution ("Message 4"). While the procedure below is discussed as a contention-based random access procedure, it is contemplated that the relay node and donor base station may perform a contention-free random access procedure comprising a dedicated relay RACH according to certain aspects of the present disclosure. It is further understood that while the RACH procedure for relays is discussed with regards to a transition between Uu and Un interfaces, the RACH procedure according to certain aspects of the present disclosure may further be utilized for other operations, such as timing synchronization, power correction, and DRX operations.

At 608, the relay node may generate and transmit a relay RACH message to the donor base station. According to certain aspects, the transition between Uu operation and Un operation on the relay node is initiated by the transmission of the RACH message on a resource designated for the relay and reserved for relay operations. The time between 608 and 610 may be considered an initial transition between use of the Uu interface and use of a Un interface between the relay node and donor base station. The relay RACH message at 608 may include a RACH preamble, relay parameters, and additional timing parameters for the random access procedure. As described, according to certain aspects, the relay RACH message may be transmitted on a RACH resource reserved and dedicated for relay operation (as compared to a RACH resource used for UEs connected with a base station) to signal to the donor base station that a RACH response may be sent back on a R-PDCCH, rather than a PDCCH. According to certain aspects, the reservation of the RACH resource may be in sequence space, time space, or frequency space. According to certain aspects, after the relay node transmits the relay RACH message using the reserved RACH resource, the relay node may begin monitoring R-PDCCH for a response.

At 610, the relay node may receive a relay RACH response from the donor base station on the R-PDCCH. According to certain aspects, the relay node may be configured to transition to the Un interface upon receiving the RACH response. According to certain aspects, the relay RACH response may include an uplink assignment for transmission of relay RACH Message 3 at a later time 612, a temporary identifier for the relay node, and timing parameters.

At 612, the relay node transmits a relay RACH Message 3 to the donor base station. The relay RACH Message 3 may include a connection establishment message, NAS request, or other suitable messaging. According to certain aspects, the RACH Message 3 comprises an RRC Reconfiguration Complete message configured to be responsive to the RRC Reconfiguration message at 606. According to certain aspects, the donor base station may be configured to transition to the Un interface upon receipt of the relay RACH Message 3 at 612 because, from the point of view of the donor base station, the transition is complete.

At 614, the donor base station confirms receipt of the relay RACH Message 3 by transmitting a relay RACH contention resolution message to the relay node. The contention resolution message may include an uplink grant of resources, a downlink assignment of resources, and a confirmation of relay identity. According to certain aspects, the transition between Uu operation and Un operation on the relay is completed by an R-PDCCH assignment sent to the relay node. According to certain aspects, the donor base station confirms receipt of the RRC Reconfiguration Complete message from the relay node by transmitting an uplink grant utilizing R-PDCCH.

At 616, the Un interface between the relay node and the donor base station may be deemed operational using R-PDCCH. At 618, the relay node may continue startup procedures by retrieving Operations, Administration, and Maintenance (OA&M) information from an OA&M server (shown in phantom). At 620, the relay node may also establish S1 and X2 connections (e.g., such as with network nodes 440 and additional base stations 435, respectively.) It is contemplated that the starting of Uu operation for UEs (including a start of broadcast channels) may begin at the same time as the transition from the Uu to Un operations on the relay node to donor base station link.

Example Radio Link Failure Handling

As discussed below, certain aspects of the present disclosure provide methods and procedures for radio link failure (RLF) recovery in wireless networks having relays. In some cases, the backhaul link connecting a relay node and a donor base station may experience connectivity problems. Accordingly, certain aspects of the disclosure provide techniques for handling RLF at a relay node.

Figure 7:
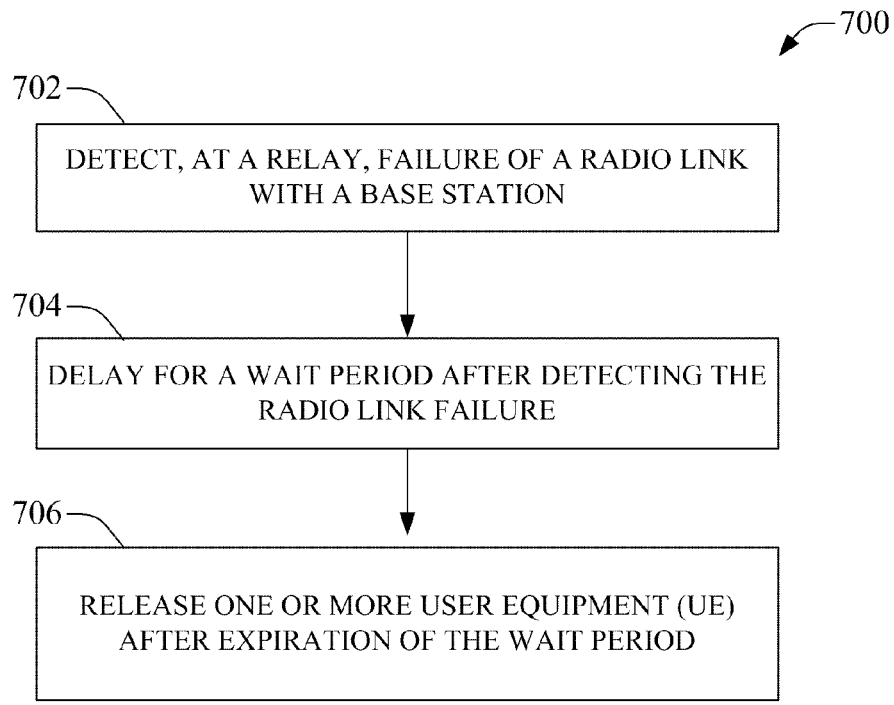
FIG. 7 illustrates example operations that may be performed by a communications apparatus to release one or more user equipments (UEs) after detecting a radio link failure (RLF) according to certain aspects of the present disclosure.
Figure 8:
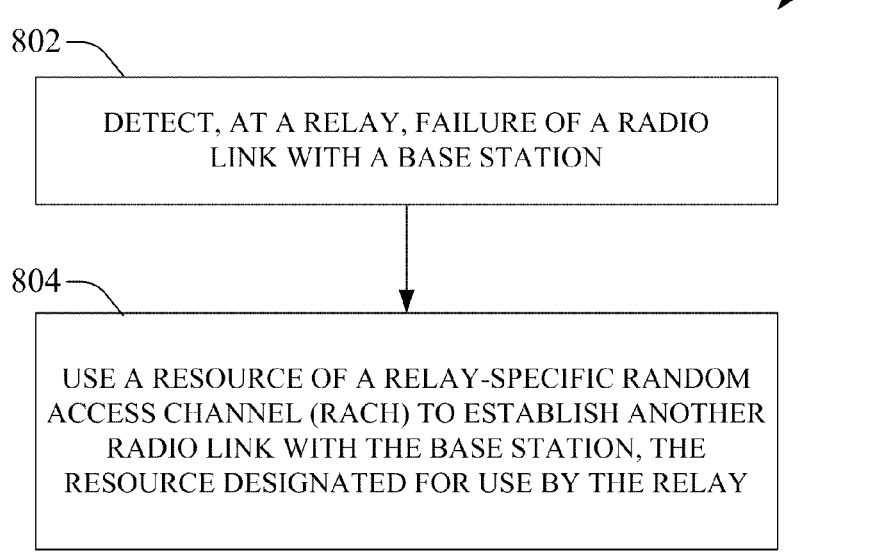
FIG. 8 illustrates example operations that may be performed by a communications apparatus to establish another radio link after failure of a previous radio link according to certain aspects of the present disclosure.

FIGS. 7-8 illustrate example operations 700 and 800 for operating a relay node according to certain aspects of the present disclosure. According to certain aspects, the example operations 700, 800 may be performed by a relay node connected with a donor base station by a Un interface and connected with at least one UE by a Uu interface. For example, the relay node 500 shown in FIG. 5 may be configured to perform the operations 700, 800. It is contemplated that other suitable components and apparatuses configured according to certain aspects of the present disclosure may be utilized to perform the example operations 700, 800.

Example operations 700 provide a method for operating a relay node to release connected UEs on loss of a relay link with a donor base station according to certain aspects of the present disclosure. The operations 700 begin, at 702, by detecting, at the relay node, failure of a radio link with a base station, such as a donor base station. The relay node may detect RLF of a Un interface with a donor base station through a variety of mechanisms, such as utilizing a RLF detection timer (e.g., timer T310.) According to certain aspects, the relay node may detect RLF with a donor base station upon expiration of a relay-specific RLF detection timer—which may be referred to as timer "T310_Relay" and is different than the T310 timer—that may be operated independently of a T310 timer. When the relay node detects failure of the backhaul link, it is understood that the UEs connected with the relay node may not receive network service and any idle UEs camped at the relay may not receive pages or be able to establish further connection. Accordingly, certain aspects of present disclosure provide mechanisms for triggering release of the connected UEs, as described below.

At 704, the operations 700 may continue by delaying for a wait period after detecting the radio link failure. According to certain aspects, the wait period may comprise a time period defined for attempts to recover from RLF (e.g., a timer T311). According to other aspects, delaying for the wait period may comprise starting a relay-specific UE-release timer (referred to in certain aspects as "T_RLF_RELAY" or "T_UE_REL_RELAY"). The UE-release timer may start when a timer for RLF detection, as described above, expires. It is noted that the backhaul link between the relay and donor base station is generally regarded as more robust compared to a link between a UE and base station. According to certain aspects, the wait period may be configured to be longer than a general RLF detection timer such as T310 or a timer for recovery attempts such as T311 to confirm that there is indeed radio link failure or provide extra time to re-establish the backhaul link, respectively.

When it becomes clear that a relay has lost its connection with a donor base station for a significant period of time, the UE(s) connected with the relay may be released. As such, at 706, the relay may release one or more UEs after expiration of the wait period. According to certain aspects, the UEs may be released after expiration of the UE release timer. According to certain aspects, the relay may transmit a redirect or RRC Connection Release message to the connected UEs to initiate release of the UEs. Additionally, the relay may also cease transmittal of broadcast channels after expiration of the wait period. According to the certain aspects, the relay may stop transmitting broadcast channels so that the now-idle UEs camped on the relay may select another cell and incoming UEs do not attempt to perform a handover to the relay.

FIG. 8 illustrates example operations 800 for operating a relay node to recover a radio link with a donor base station upon RLF, according to certain aspects of the present disclosure. The operations 800 may begin at 802, by detecting, at the relay, failure of a radio link with a base station. The radio link failure may be detected according to certain aspects as described above. It is further understood that upon detection of radio link failure at 802, the relay may release one or more connected UEs according to certain aspects as described above.

At 804, the relay uses a resource of a relay-specific RACH to establish another radio link with the base station, wherein the resource is designated for use by the relay. The resource designated for use by the relay may be a time resource (e.g., a subframe, symbol, or slot), a frequency resource (e.g., a subchannel or designated bandwidth of subcarriers), or a combination of time and frequency resources. According to certain aspects, the relay-specific resource may be from among a pool of resources reserved for relay communication. According to certain aspects, the relay-specific resource may be allocated by the donor base station and signaled to the relay using earlier communications. According to certain aspects, the relay may perform a random access procedure comprising transmitting a relay-specific RACH message to the base station and receiving a relay-specific RACH response from the base station as described in detail below. According to certain aspects, the relay-specific RACH response is received via an R-PDCCH.

Figure 9:
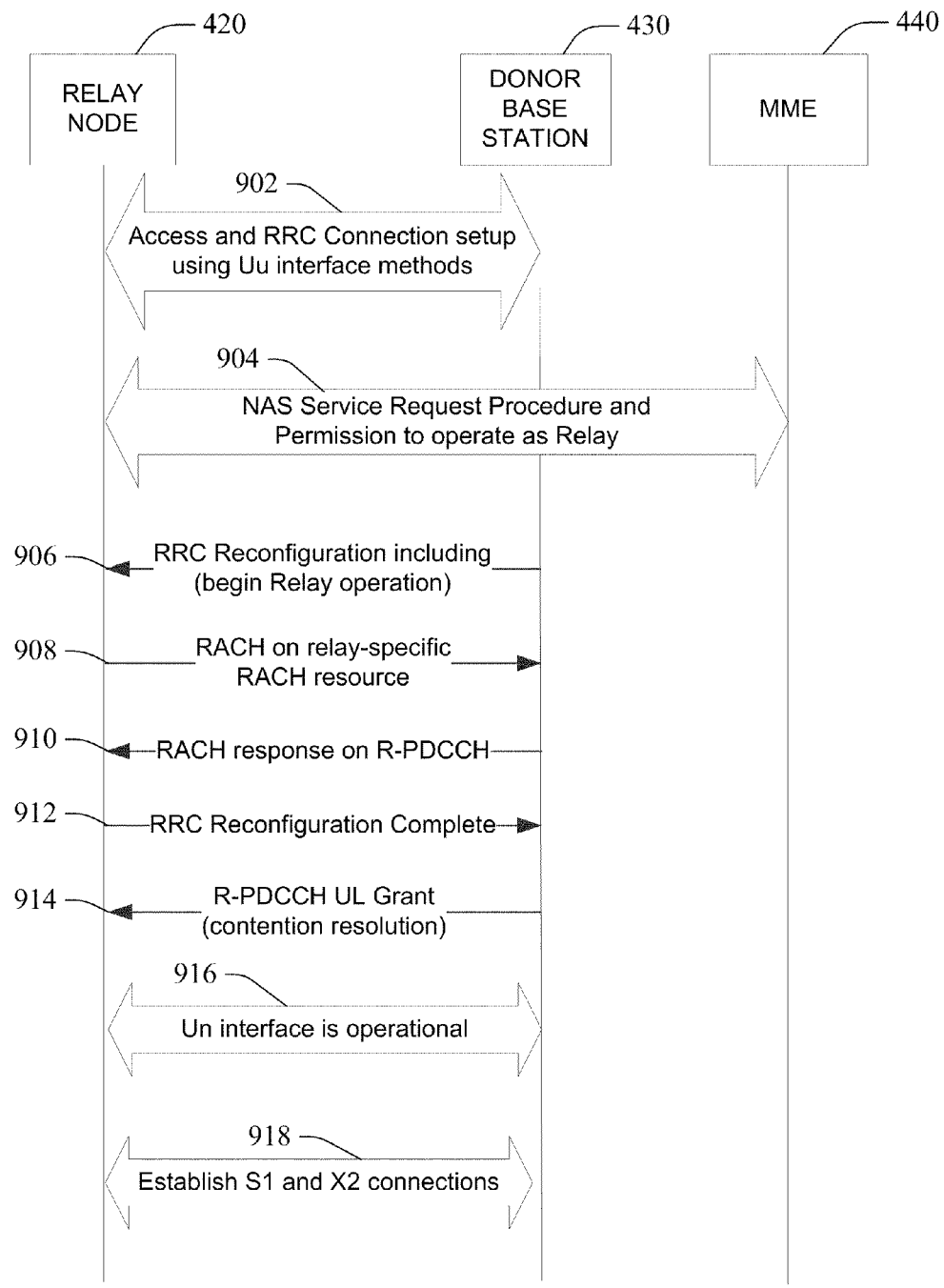
FIG. 9 is a sequence diagram illustrating example operations for relay link failure recovery according to certain aspects of the present disclosure.

FIG. 9 is a sequence diagram illustrating operations for an RLF recovery mechanism according to certain aspects of the disclosure. Upon detecting RLF on a Un interface connecting a relay node and a donor base station, the relay may initiate RLF recovery as described below. According to certain aspects, a relay may utilize Un RACH procedures, with a RACH on a resource reserved for relays, and an R-PDCCH-based RACH response. It is also understood that a relay may also utilize Uu RACH procedures, and subsequently transition to a Un interface using dedicated messaging. It is further understood that RLF recovery operations illustrated in FIG. 9 may be similar to the relay startup operations described in FIG. 6. For clarity, the operations are depicted as being performed by the example system 400 shown in FIG. 4, but it is understood that the example operations may be performed by any suitable apparatus and components according to aspects of the disclosure.

The RLF recovery operations begin at 902, where a relay node may connect to a donor base station using Uu interface methods. According to certain aspects, the relay node may establish a connection with the donor base station as if the relay node were a UE. According to certain aspects, the relay node and the donor base station may perform an RRC connection establishment procedure which includes exchanging an RRC Connection Request message, a RRC Connection Setup message, and a RRC Connection Setup Complete message.

At 904, the relay node may perform a service request procedure with an MME and request permission to operate as a relay within the wireless network. According to certain aspects, the relay node may initiate an NAS Service Request procedure with the MME. According to certain aspects, the relay node may attempt an NAS Service Request and by-pass re-establishment of an RRC connection. The NAS Service Request procedure advantageously allows re-use of parameters and information previously established when the relay node previously connected with the donor base station. For example, the NAS Service Request procedure permits re-use of the previously-established security keys, eliminating the need to communicate with other network nodes, such the Home Subscriber Server (HSS). The NAS Service Request procedure may include the MME transmitting the relay node's previously established information to the donor base station. According to certain aspects, the MME may signal to the donor base station that the relay node has been granted permission to operate as a relay in the wireless node.

At 906, the donor base station may transmit a connection reconfiguration message to initiate a reconfiguration on the Uu interface between donor base station and the relay node into a Un interface. According to certain aspects, the connection reconfiguration may comprise an RRC Reconfiguration message that comprises an indication to the relay node to begin relay operations.

Starting at 908, the relay node initiates a random access procedure utilizing a relay-specific RACH to initiate RLF recovery. At 908, the relay node may transmit a relay RACH message to the donor base station. According to certain aspects, the relay RACH message may be transmitted on a RACH resource reserved/dedicated for relay operations. According to certain aspects, the dedicated relay RACH resource may be allocated by the donor base station and signaled to the relay node with an earlier communication, for example, such as the connection reconfiguration message at 906. According to certain aspects, the dedicated relay RACH resource may selected by the relay node from among a plurality of resources pre-determined by the relay node and base station to be reserved for relay communication. The use of the dedicated relay RACH resource may indicate to the donor base station that a RACH response may be sent back to the relay node on an R-PDCCH, rather than a PDCCH.

At 910, the donor base station may transmit a relay RACH response to the relay node utilizing R-PDCCH. According to certain aspects, the relay RACH response may include an uplink resource assignment on the Un interface, timing parameters, and other Un interface connection parameters.

At 912, the relay node may respond to the RACH response with a message indicating that the connection between the relay node and the donor base station has been reconfigured to utilize a Un interface. According to certain aspects, the relay node may transmit a RRC Reconfiguration Complete message to the donor base station.

At 914, the donor base station completes the random access procedure by transmitting a contention resolution message utilizing R-PDCCH to confirm receipt of the reconfiguration complete message. According to certain aspects, the contention resolution message may comprise an uplink grant of resources on the Un interface, timing parameters, power correction parameters, and other information utilized to establish and manage the Un interface.

Accordingly, at 916, the Un interface between the relay node and the donor base station may be deemed operational and utilizing R-PDCCH. It is understood that after 916, an OA&M configuration step may be skipped, when compared to the operations discussed in FIG. 6, because the previous OA&M configuration may be reused. According to certain aspects, the relay node may receive a copy of the previously established OA&M configuration from the MME or OA&M server (not shown). At 918, the relay node may further establish S1 and X2 connections, such as with network nodes and additional base stations, as described above.

Figure 10:
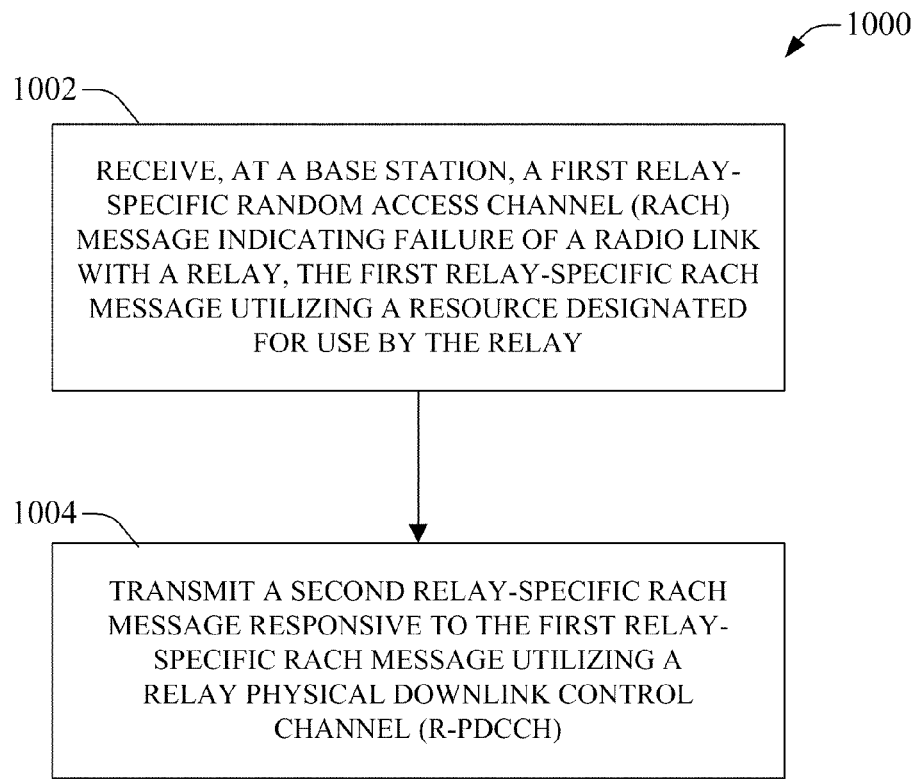
FIG. 10 illustrates example operations that may be performed by a communications apparatus to establish another radio link after failure of a previous radio link according to certain aspects of the present disclosure.

FIG. 10 illustrates example operations 1000 for operating a base station to recover a radio link with a relay upon RLF, according to certain aspects of the present disclosure. According to certain aspects, the example operations 1000 may be performed by a donor base station associated with a relay node by a Un interface. For example, the donor base station 510 shown in FIG. 5 may be configured to perform the operations 1000. It is contemplated that other suitable components and apparatuses configured according to certain aspects of the present disclosure may be utilized to perform the example operations 1000.

According to certain aspects, the operations 1000 generally provide that a base station, responsive to a failure of a radio link with a relay node, may use a resource of a relay-specific RACH to establish another radio link with the relay node, wherein the resource is designated for use by the relay. The resource designated for use by the relay may be a time resource (e.g., a subframe, symbol, or slot), a frequency resource (e.g., a subchannel or designated bandwidth of subcarriers), or a combination of time and frequency resources. According to certain aspects, the base station may allocate the designated resource for use by the relay from among a pool of resources reserved for the relay-specific RACH. The base station may signal the allocated resource to the relay node in earlier communications, for example, using a RRC connection reconfiguration message. According to certain aspects, the designated resource may be one of a plurality of resources reserved for relay communication.

The operations 1000 may begin at 1002, by receiving, at the base station, a first relay-specific RACH message indicating failure of a radio link with a relay. According to certain aspects, the first relay-specific RACH message is received utilizing a resource designated for use by the relay. According to certain aspects, the first relay-specific RACH message is configured to initialize a random access procedure for RLF recovery.

At 1004, the base station may transmit a second relay-specific RACH message responsive to the first RACH message. For certain aspects, the base station may transmit the second relay-specific RACH message utilizing a R-PDCCH. According to certain aspects, the second relay-specific RACH message may comprise a RACH response configured to be responsive to the first relay-specific RACH message. For example, the relay-specific RACH response may include a temporary relay identity, timing and power correction parameters, as well as a temporary uplink grant for the relay to utilize to complete the random access procedure.

According to certain aspects, RLF recovery may be performed with Uu interface RACH procedures. However, it is acknowledged that these procedures may result in the loss of enhanced physical channels, and may require re-establishment thereof. Accordingly, certain aspects of the present disclosure also provide a mechanism for RLF recovery that is performed with Un interface RACH procedures. A Un interface RACH procedure as described above advantageously permits the R-PDCCH and associated channels to be continued to be used. These channels advantageously do not have to be restarted or re-established, and apparatuses according to certain aspects may continue to utilize enhanced physical layers during operation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting may comprise a transmitter, such as the transmitter unit 254 of the receiver system 250 (e.g., the access terminal) depicted in FIG. 2 or the transmitter unit 222 of the transmitter system 210 (e.g., the access point) shown in FIG. 2. Means for receiving may comprise a receiver, such as the receiver unit 254 of the receiver system 250 depicted in FIG. 2 or the receiver unit 222 of the transmitter system 210 shown in FIG. 2. Means for processing, means for determining, means for detecting, means for delaying, means for releasing, means for ceasing, means for using, and/or means for allocating may comprise a processing system, which may include one or more processors, such as the processor 270 of the receiver system 250 or the processor 230 of the transmitter system 210 illustrated in FIG. 2. These means may also comprise any suitable combination of the link detection component 502, the random access channel (RACH) components 506, 516, and the connection component of FIG. 5.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
   detecting, at a relay, failure of a radio link with a base station, wherein the failure of the radio link is on a first interface between the relay and the base station;
   using, at the relay, a resource of a relay-specific random access channel (RACH) reserved for relay communication to establish another radio link with the base station, the resource designated for use by the relay, wherein the designated relay-specific resource is selected by the relay, rather than being allocated by the base station, and signaled to the relay with an earlier communication;
   after the detecting of radio link failure, connecting with the base station using a second interface on which the relay appears as a user equipment (UE) to the base station; and
   transitioning to the first interface on the another radio link with the base station using the relay-specific RACH resource.

2. The method of claim 1, wherein the resource is one of a plurality of resources reserved for relay communication.

3. The method of claim 1, wherein the using comprises:
   transmitting a relay-specific RACH message to the base station; and
   receiving a relay-specific RACH response from the base station.

4. The method of claim 3, wherein the relay-specific RACH response is received via a relay physical downlink control channel (R-PDCCH).

5. The method of claim 1, further comprising:
   delaying for a wait period after detecting the radio link failure; and
   releasing one or more user equipments (UEs) after expiration of the wait period.

6. A method for wireless communications, comprising:
   receiving, at a base station, a relay-specific random access channel (RACH) message from a relay indicating failure of a radio link with the relay, wherein the failure of the radio link is on a first interface between the relay and the base station;
   responsive to the failure of a radio link with the relay, using, at the base station, a resource of a relay-specific RACH reserved for relay communication to establish another radio link with the relay, the resource designated for use by the relay, wherein the designated relay-specific resource is selected by the relay, rather than being allocated by the base station, and signaled to the relay with an earlier communication;
   after the receiving the indication of radio link failure, connecting with the relay using a second interface on which the relay appears as a user equipment (UE) to the base station; and
   transitioning to the first interface on the another radio link with the relay using the relay-specific RACH resource.

7. The method of claim 6, wherein the using comprises: transmitting a relay-specific RACH response to the relay.

8. The method of claim 7, wherein the relay-specific RACH response is transmitted via a relay physical downlink control channel (R-PDCCH).

9. The method of claim 6, further comprising:
   allocating the resource from among a plurality of resources reserved for the relay-specific RACH.

10. The method of claim 6, wherein the resource is one of a plurality of resources reserved for relay communication.

11. An apparatus for wireless communications, comprising:
    at least one processor configured to:
        detect, at a relay, failure of a radio link with a base station, wherein the failure of the radio link is on a first interface between the relay and the base station; and
        use, at the relay, a resource of a relay-specific random access channel (RACH) reserved for relay communication to establish another radio link with the base station, the resource designated for use by the relay, wherein the designated relay-specific resource is selected by the relay, rather than being allocated by the base station, and signaled to the relay with an earlier communication;
        after the detecting of radio link failure, connect with the base station using a second interface on which the relay appears as a user equipment (UE) to the base station; and
        transition to the first interface on the another radio link with the base station using the relay-specific RACH resource; and
    a memory coupled to the at least one processor.

12. The apparatus of claim 11, wherein the resource is one of a plurality of resources reserved for relay communication.

13. The apparatus of claim 11, wherein the at least one processor is further configured to:
    transmit a relay-specific RACH message to the base station; and
    receive a relay-specific RACH response from the base station.

14. The apparatus of claim 13, wherein the at least one processor is further configured to receive the relay-specific RACH response via a relay physical downlink control channel (R-PDCCH).

15. The apparatus of claim 11, wherein the at least one processor is further configured to:
    delay for a wait period after detection of the radio link failure and release one or more user equipments (UEs) after expiration of the wait period.

16. An apparatus for wireless communications, comprising:
    at least one processor configured to:
        receive, at a base station, a relay-specific random access channel (RACH) message from a relay indicating failure of a radio link with the relay, wherein the failure of the radio link is on a first interface between the relay and the base station;
        responsive to the failure of the radio link with the relay, use, at the base station, a resource of a relay-specific RACH reserved for relay communication to establish another radio link with the relay, the resource designated for use by the relay, wherein the designated relay-specific resource is selected by the relay, rather than being allocated by the base station, and signaled to the relay with an earlier communication;
        after the detecting of radio link failure, connect with the relay using a second interface on which the relay appears as a user equipment (UE) to the base station; and transition to the first interface on the another radio link with the relay using the relay-specific RACH resource; and a memory coupled to the at least one processor.

17. The apparatus of claim 16, wherein the at least one processor is further configured to:

transmit a relay-specific RACH response to the relay.

18. The apparatus of claim 17, wherein the at least one processor is further configured to transmit the relay-specific RACH response via a relay physical downlink control channel (R-PDCCH).

19. The apparatus of claim 16, wherein the at least one processor is further configured to allocate the resource from among a plurality of resources reserved for the relay-specific RACH.

20. The apparatus of claim 16, wherein the resource is one of a plurality of resources reserved for relay communication.

21. An apparatus for wireless communications, comprising:

means for detecting, at a relay, failure of a radio link with a base station, wherein the failure of the radio link is on a first interface between the relay and the base station;

means for using, at the relay, a resource of a relay-specific random access channel (RACH) reserved for relay communication to establish another radio link with the base station, the resource designated for use by the apparatus, wherein the designated relay-specific resource is selected by the relay, rather than being allocated by the base station, and signaled to the relay with an earlier communication;

means for connecting with the base station using a second interface on which the relay appears as a user equipment (UE) to the base station after the detecting of radio link failure; and means for transitioning to the first interface on the another radio link with the base station using the relay-specific RACH resource.

22. The apparatus of claim 21, wherein the resource is one of a plurality of resources reserved for relay communication.

23. The apparatus of claim 21, wherein the means for using comprises:

means for transmitting a relay-specific RACH message to the base station; and means for receiving a relay-specific RACH response from the base station.

24. The apparatus of claim 23, wherein the relay-specific RACH response is received via a relay physical downlink control channel (R-PDCCH).

25. The apparatus of claim 21, further comprising:

means for delaying for a wait period after detecting the radio link failure; and means for releasing one or more user equipments (UEs) after expiration of the wait period.

26. An apparatus for wireless communications, comprising:

means for receiving, at a base station, a relay-specific random access channel (RACH) message from a relay indicating failure of a radio link with the relay, wherein the failure of the radio link is on a first interface between the relay and the base station;

means for, responsive to the failure of the radio link with the relay, using, at the base station, a resource of a relay-specific RACH reserved for relay communication to establish another radio link with the relay, the resource designated for use by the relay, wherein the designated relay-specific resource is selected by the relay, rather than being allocated by the base station and signaled to the relay with an earlier communication;

means for connecting with the relay using a second interface on which the relay appears as a user equipment (UE) to the base station after the receiving the indication of radio link failure; and means for transitioning to the first interface on the another radio link with the relay using the relay-specific RACH resource.

27. The apparatus of claim 26, wherein the means for using comprises:

means for transmitting a relay-specific RACH response to the relay.

28. The apparatus of claim 27, wherein the relay-specific RACH response is transmitted via a relay physical downlink control channel (R-PDCCH).

29. The apparatus of claim 26, further comprising:

means for allocating the resource from among a plurality of resources reserved for the relay-specific RACH.

30. The apparatus of claim 26, wherein the resource is one of a plurality of resources reserved for relay communication.

31. A non-transitory computer-readable medium having instructions stored thereon, the instructions executable by one or more processors for:

detecting, at a relay, failure of a radio link with a base station, wherein the failure of the radio link is on a first interface between the relay and the base station;

using, at the relay, a resource of a relay-specific random access channel (RACH) reserved for relay communication to establish another radio link with the base station, the resource designated for use by the relay, wherein the designated relay-specific resource is selected by the relay, rather than being allocated by the base station, and signaled to the relay with an earlier communication;

after the detecting of radio link failure, connecting with the base station using a second interface on which the relay appears as a user equipment (UE) to the base station; and transitioning to the first interface on the another radio link with the base station using the relay-specific RACH resource.

32. The non-transitory computer-readable medium of claim 31, wherein the resource is one of a plurality of resources reserved for relay communication.

33. The non-transitory computer-readable medium of claim 31, wherein the instructions for using comprise instructions for:

transmitting a relay-specific RACH message to the base station; and receiving a relay-specific RACH response from the base station.

34. The non-transitory computer-readable medium of claim 33, wherein the relay-specific RACH response is received via a relay physical downlink control channel (R-PDCCH).

35. The non-transitory computer-readable medium of claim 31, further comprising instructions for:

delaying for a wait period after detecting the radio link failure; and releasing one or more user equipments (UEs) after expiration of the wait period.

36. A non-transitory computer-readable medium having instructions stored thereon, the instructions executable by one or more processors for:

receiving, at a base station, a relay-specific random access channel (RACH) message from a relay indicating failure of a radio link with the relay, wherein the failure of the radio link is on a first interface between the relay and the base station;

responsive to the failure of the radio link with the relay, using, at the base station, a resource of a relay-specific RACH reserved for relay communication to establish another radio link with the relay, the resource designated for use by the relay, wherein the designated relay-specific resource is selected by the relay, rather than being allocated by the base station, and signaled to the relay with an earlier communication;

after the receiving the indication of radio link failure, connecting with the relay using a second interface on which the relay appears as a user equipment (UE) to the base station; and transitioning to the first interface on the another radio link with the relay using the relay-specific RACH resource.

37. The non-transitory computer-readable medium of claim 36, wherein the instructions for using comprise instructions for:

transmitting a relay-specific RACH response to the relay.

38. The non-transitory computer-readable medium of claim 37, wherein the relay-specific RACH response is transmitted via a relay physical downlink control channel (R-PDCCH).

39. The non-transitory computer-readable medium of claim 36, further comprising instructions for:

allocating the resource from among a plurality of resources reserved for the relay-specific RACH.

40. The non-transitory computer-readable medium of claim 36, wherein the resource is one of a plurality of resources reserved for relay communication.

* * * * *